Feb. 16, 1932.   A. F. O'CONNOR   1,845,513
HAND BRAKE
Original Filed May 14, 1928
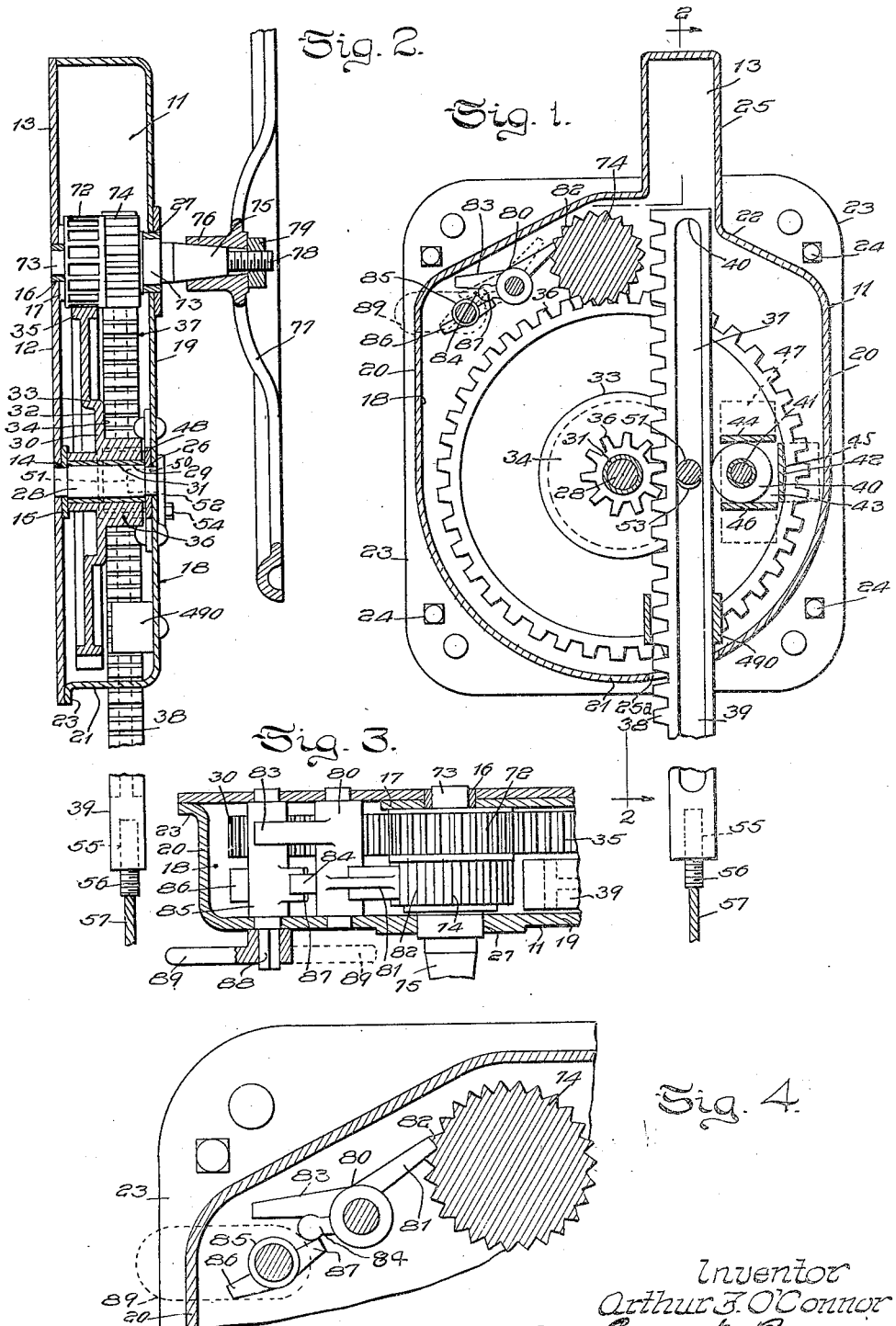
Witness
William G. Milson
Inventor
Arthur F. O'Connor
By Samuel R. Banning
Atty.

Patented Feb. 16, 1932

1,845,513

UNITED STATES PATENT OFFICE

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS

HAND BRAKE

Original application filed May 14, 1928, Serial No. 277,606. Divided and this application filed July 15, 1929. Serial No. 378,219.

This invention relates to improvements in hand brakes and forms a division of my application Serial No. 277,606, filed May 14, 1928.

An object of the invention is to provide a hand brake for a railway car of the pull-up type in which a reciprocating rack bar is employed, together with means for driving the rack bar and guiding the same in its movement, in conjunction with novel pawl and ratchet mechanism for holding the brake in any desired position.

A more particular object of the invention is to provide, in a brake of the type indicated, a pawl and ratchet mechanism wherein an actuating element is utilized for moving the pawl to engaged and disengaged position and holding the same in either of said positions under the influence of gravity.

Other and further objects of the invention will more clearly appear from the description and claim hereinafter following.

In the drawings forming a part of this specification, Figure 1 is a vertical sectional view through the brake housing and disclosing the interior arrangement of the operating parts. Figure 2 is a vertical transverse sectional view of the invention, corresponding substantially to the line 2—2 of Figure 1. Figure 3 is an enlarged fragmentary horizontal transverse sectional view through a portion of the housing and disclosing the pawl and ratchet mechanism forming a part of the invention. And Figure 4 is an enlarged fragmentary side elevational view of the pawl and ratchet mechanism shown in Figure 1.

As shown in the drawings, 11 indicates a housing or casing adapted to be secured to the end wall of a car by any suitable means. The housing includes a substantially flat rectangular supporting plate having a flat extension 13 projecting from the upper edge thereof, and centrally of the plate there is provided a bearing opening 14 surrounded by reinforcing member 15, welded in position. Above the bearing opening, there is provided another bearing opening 16, also strengthened by suitable reinforcing member 17. A cup-shaped element 18 is provided which cooperates with the plate 12 to complete the housing, said element including a front wall 19, side walls 20—20, a curved bottom wall 21 and a top wall 22, of irregular outline, all of said walls being integrally formed. The edges of said walls have integrally formed therewith a laterally projecting flange 23 which rests flat against the plate 12 adjacent the edges thereof and is detachably secured to the plate 12 by screw bolts 24. The top wall 22 is provided with a hollow channel-shaped part 25 which cooperates with the projecting portion 13 of the plate 12 to provide a casing affording clearance for a moving part of the operating mechanism. The bottom wall 21 is provided with a slot 25$^a$ in line with the extension on the housing. The front wall 19 of the cup-shaped element has a bearing opening 26 in line with the bearing opening 14, and also has an opening 27 in line with the opening 16 in the plate 12.

Mounted in the bearing openings 14 and 26 are the reduced ends of an axle 28 upon which is mounted the hub 29 of a gear member 30, there being a bushing 31 interposed between the hub 29 and the axle 28. Formed integrally with the hub 29 is a centrally disposed radially extending web 32, which is offset toward the rear as indicated at 33, to define an annular bearing face 34, and beyond the offset the web extends some distance and merges with the rim of a gear of relatively large diameter, indicated at 35, said gear being adapted to cooperate with the driving pinion hereinafter referred to. The hub 29 of the gear member 30 on the outer or forward side of the annular bearing face 34 has formed thereon a gear 36 of considerably smaller diameter than the gear 35. Cooperating with the gear 36 and adapted to be reciprocated thereby is a rack bar 37 having teeth 38 which are engaged by the teeth of the gear 36. The rack bar is of considerable length and of H form in cross-section, providing slots at opposite sides thereof, one of which, indicated at 39, is closed at the top by an abutment indicated at 40. The rack bar 37 is held in engagement with the gear 36 by means of a roller 40, which is supported upon a spindle 41, the inner end of the latter being supported by means of a peculiarly shaped spider or bracket 42. The bracket 42 is provided with a supporting portion 43 in which the end of the spindle 41 is journaled, and with the supporting portion are integrally formed three walls 44, 45 and 46, each of which is provided with an outwardly projecting flange indicated at 47, the flanges being rigidly secured to the forward wall 19 of the housing. A reinforcing strip 48 is riveted to the front wall 19 of the housing in such manner as to reinforce the bearing opening 26 for the axle 28, and also to afford a bearing for the forward end of the spindle 41 as indicated at 49. Below the gear 36 and the roller 40, there is provided a channel-shaped bracket 490, the web of which is secured to the front plate 19 by a rivet, and the legs of which are disposed upon opposite sides of the rack bar 37. In line with the slot 39 in the rack bar, the front wall 19, and reinforcing strip 48 are provided with an oval-shaped slot 50, the major axis of which extends vertically. The slot 50 is adapted for the reception of a stop member 51 which projects into the groove 39 of the rack bar, as best shown in Figure 2. The stop 51 is integrally formed with a strap 52 adapted to be disposed upon the outer side of the front wall 19 of the housing. Said stop on its inner end is provided with a projecting shoulder 53 adapted to be moved to position to overlap the edge of the slot in the reinforcing member 48 when in operative position.

The strap 52 is provided, adjacent its opposite end, with an aperture adapted to register with a threaded aperture in the front plate 19 when the said stop 51 is in position, the aperture being adapted for the reception of a screw bolt 54. By this arrangement, the stop member 53 is held in position by the use of only one bolt, the opposite end of the strap being maintained in position through engagement of the shoulder 53 with the inner face of the reinforcing plate 48 adjacent the elongated slot 50 therein.

The lower end of the rack bar 37 is provided with a threaded aperture 55 for the reception of a threaded member 56, to which a cable or chain may be connected, a cable 57 being shown in the drawings. The cable 57 extends downwardly and underneath the car where it is connected to the brake rod, not shown.

The gear 35 is adapted to be driven by a pinion 72 mounted upon a spindle 73 which is rotatably supported in the bearing openings 16 and 27 of the housing 11. The pinion 72 is preferably formed integrally with the spindle 73, and also with a ratchet wheel 74 carried by said spindle. The outer end of the spindle 73 is provided with a tapered portion 75 for the reception of the hub 76 of a hand-wheel 77, the tapered portion having a reduced threaded end 78 for the reception of a binding nut 79.

Cooperating with the ratchet wheel 74 is a novel pawl operating mechanism. Mounted in suitable bearing openings in the plate 12 and front wall 19 of the housing is a pawl element 80 having integrally formed therewith a pawl 81 adapted to engage the ratchet teeth 82 of the ratchet wheel 74. The element 80 at one side of the pawl 81 is provided with a stop 83. In line with the pawl 81, the element 80 is provided with a tail piece 84 adapted to be engaged by a trip member 85.

The trip member 85 is journalled in the plate 12 and front wall 19 of the housing, and is provided with actuating portions 86 and 87, each of which in certain positions of the trip member 85 is adapted to engage the tail piece 84 of the rotatable element 80, and the stop 83 is adapted to engage the trip member to limit movement of the rotatable element 80. The outer end of the trip member is squared in cross section, as indicated at 88, and mounted upon the squared portion 88 is a handle 89, said handle being so disposed as to provide a gravity influenced portion for holding the trip member 85 in one position or another, as desired.

In operation, assuming it is desired to set the brake, the hand wheel 77 is rotated in a clockwise direction, imparting similar movement to the pinion 72 and the ratchet wheel 74. The pinion 72, by reason of its engagement with the gear 35, imparts counter-clockwise rotation thereto, which movement is transmitted to the gear 36 which directly engages the rack bar 37. Due to the presence of the relatively small driving pinion, and the relative sizes of the gears 35 and 36, the hand wheel 77 must be revolved a number of times to impart a single revolution to the gear 36. Due to the engagement of the gear 36 with the rack bar, the rack bar moves slowly upward, carrying therewith the cable 57, the rack bar being guided in its movements by means of the gear 36 and the roller 40, and also by means of the channel-shaped bracket 490.

During rotation of the ratchet wheel 74 in a clockwise direction, the pawl mechanism and trip device are in the position illustrated in Figure 4; that is, the pawl proper is in engagement with the teeth 82 of the ratchet wheel and is maintained in such engagement by reason of the fact that the actuating portion 87 bears beneath the tail piece 84 under the influence of the weight of the handle 89, the pawl, of course, being free to ratchet over the wheel during its clockwise movement, and preventing reverse rotation of the ratchet wheel. When it is desired to release the brake, the handle 89 is grasped and swung in a clockwise direction until such time as the actuating portion 86 strikes the tail piece 84 of the element 80, imparting to said element a counter-clockwise movement which disconnects the pawl 81 from the teeth 82 of the ratchet 74, and the pawl is held entirely free of the teeth of the ratchet wheel by reason of the weighted portion as provided by the handle 89, resting through the actuating portion 86 upon the tail piece 84, in this way permitting full unwinding movement of the gears and full release of the brakes. The downward movement of the rack bar 37, of course, is accomplished through a pull of the cable thereon when the brake is released, and the stop 51, by its engagement with the abutment 40 on the rack bar, limits downward movement of the latter.

While I have herein shown and described what I now consider the preferred manner of carrying out my invention, the same is merely illustrative and I contemplate all changes and modifications that come within the scope of the claim appended hereto.

I claim:

In ratchet mechanism, the combination of a rotatable element having a ratchet wheel thereon, a pivoted pawl adapted to be moved into and out of engagement with said ratchet wheel and having a rearwardly extending tail piece, a trip member rotatably mounted in proximity to the pivot for the pawl and having oppositely extending actuating fingers, one of which is positioned when rotated to bear upwardly against the tail piece to hold the pawl in engagement with the ratchet and the other of which is positioned, when rotated to bear downwardly upon the tail piece, to lift the pawl out of engagement with the ratchet wheel, a housing enclosing the parts above enumerated, the trip member including a weighted handle outside of the housing and adapted to be swung from one position to another and adapted to act under the influence of gravity to hold the parts in either position of adjustment.

In witness that I claim the foregoing I have hereunto subscribed my name this 6th day of July, 1929.

ARTHUR F. O'CONNOR.